US010909553B1

(12) United States Patent
Schulte et al.

(10) Patent No.: US 10,909,553 B1
(45) Date of Patent: Feb. 2, 2021

(54) SYSTEMS AND METHODS FOR GENERATING AN AFFINITY GRAPH

(71) Applicant: JPMorgan Chase Bank, N.A., New York, NY (US)

(72) Inventors: Benjamin Schulte, Brooklyn, NY (US); Gavin C. Michael, New York, NY (US); Abhijit Bose, New York, NY (US); Matthew Lightman, New York, NY (US); Vijay Pappu, Bayonne, NJ (US); John Maiden, Bloomfield, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 688 days.

(21) Appl. No.: 14/878,395

(22) Filed: Oct. 8, 2015

Related U.S. Application Data

(60) Provisional application No. 62/134,959, filed on Mar. 18, 2015.

(51) Int. Cl.
*G06Q 30/02* (2012.01)
(52) U.S. Cl.
CPC ................. *G06Q 30/0201* (2013.01)
(58) Field of Classification Search
CPC .............................................. G06Q 30/0201
See application file for complete search history.

(56) References Cited

U.S. PATENT DOCUMENTS

| 9,195,988 B2 | 11/2015 | Fischer et al. | |
|---|---|---|---|
| 2004/0006510 A1* | 1/2004 | Lertzman | G06Q 30/02 705/14.52 |
| 2008/0235216 A1* | 9/2008 | Ruttenberg | G06F 17/30867 707/999.005 |
| 2009/0132347 A1* | 5/2009 | Anderson | G06Q 30/02 705/14.52 |
| 2011/0264501 A1* | 10/2011 | Clyne | G06Q 20/10 705/14.25 |
| 2013/0046589 A1* | 2/2013 | Grigg | G06Q 30/02 705/14.1 |
| 2014/0372338 A1* | 12/2014 | Kim | G06Q 30/0282 705/347 |

* cited by examiner

*Primary Examiner* — Nadja N Chong Cruz
(74) *Attorney, Agent, or Firm* — Greenberg Traurig LLP

(57) ABSTRACT

Systems and methods for generating an affinity graph are disclosed. According to one embodiment, a method may include (1) receiving customer data for a plurality of customers and merchant data for a plurality of merchants; (2) generating an initial customer table for each customer from the customer data; (3) generating an initial merchant table for each merchant from the merchant data; (4) receiving transaction data from a plurality of sources; (5) enhancing the initial customer tables and the initial merchant tables; (7) associating each customer and each merchant with at least one attribute based on the enhanced customer tables and the enhanced merchant tables; (8) determining an attribute score for each attribute; and (9) determining an affinity for one of the plurality of customers based on the attribute score for an attribute that is common to the one customer and another one of the plurality of customers.

17 Claims, 9 Drawing Sheets

```
"date" : 12-FEB-2015
"customer_id": "abcd1234",

/* customer attributes */
"consumer_card_indicator": "1",
"card1_card_indicator": "0",
"card2_card_indicator": "0",
"card3_card_indicator": "0",
"card4_card_indicator": "0",
"card5_card_indicator": "0",
"card6_card_indicator": "0",
"card7_card_indicator": "0",
"customer_tenure": ">15 years",
"online_reach": "90 day active online",
"mobonline_reach": "not mobile enrolled",
"card_acct_bal_amt": "23548",
"lob_mix": "card and other",
"card_indicator": "1",
"retail_indicator": "0",
"mortgage_indicator": "0",
"auto_indicator": "0",
"bank_12m_spend": "197266",
"external_12m_spend": "117022",
"size_of_wallet_12m": "314288",
"size_of_wallet_bucket": "100K+",
"bank_share_of_wallet": "0.63",
"bank_share_of_wallet_bucket": "0.50-0.74",
"desg_mkt_area_cd": "618",
"desg_mkt_area_tx": "houston tx",
"ad_postalcode1": "77381",
"state": "TX",
```

FIGURE 3

```
"brand1_brand": "enthusiast",
"brand1_final_score": "70",
" brand1_transactions_last_12m": "6",
" brand1_spend_last_12m": "$87.23",
" brand1_distinct_merchants": "8"
...
```

FIGURE 4A

```
"baseball_interest": "enthusiast",
"baseball_final_score": "95",
"baseball_transactions_last_12m": "23",
"baseball_spend_last_12m": "$439.01",
"baseball_distinct_merchants": "3"
```

FIGURE 4B

```
"date" : 01-JAN-2001
"merchant_id": "1234abcd,
"merchant_name": "Bobs Store",
"channel": "null",
"country": "us",
"state": "null",
"source": "credit card",
"mcc_code": "5999",
"mcc_name": "Miscellaneous and Specialty Retail Stores",
"mcc_group": "19",
"mcc_group_name": "Business Supplies",
"privacy_suppress": "false",
"postal_code": "07047",
"unique_xref": "139805",
"total_transactions_last12m: "394395",
"total_spend_last12m": "26423806",
"male_perc": "0.53",
"female_perc": "0.47",
"avg_bank_12m_spend": "32423.21",
"avg_external_12m_spend": "13267.03",
"avg_size_of_wallet_12m": "45690.24",
"avg_bank_share_of_wallet": "0.70",
"card_perc": [
  {
    "card1_card_ind": "0.03",
    "card2_card_ind": "0.45",
    "card3_card_ind": "0.45",
    "card4_card_ind": "0.02",
    "card5_card_ind": "0.07",
    "card6_card_ind": "0.14",
    "card7_card_ind": "0.17",
    "card8_card_ind": "0.57"
  }
],
"age_trans_perc": [
  {
    "18_32": "0.09",
    "33_46": "0.20",
    "47_56": "0.24",
    "57_64": "0.22",
    "65p": "0.25"
  }
],
```

FIGURE 5A

```
"regional_trans_perc": [
  {
    "new_england": "0.07",
    "mid_atlantic": "0.26",
    "mw": "0.18",
    "south_atlantic": "0.18",
    "south": "0.04",
    "texlahoma": "0.08",
    "mountain": "0.06",
    "pacific": "0.14"
  }
],
"online_score": "0.302",
"hourly_trans_perc": [
  {
    "2_5": "0.02",
    "6_9": "0.22",
    "10_13": "0.29",
    "14_17": "0.27",
    "18_21": "0.20",
    "22_1": "0.00"
  }
],
"monthly_trans_perc": [
  {
    "jan": "0.11",
    "feb": "0.09",
    "mar": "0.11",
    "apr": "0.11",
    "may": "0.09",
    "jun": "0.10",
    "jul": "0.06",
    "aug": "0.07",
    "sep": "0.07",
    "oct": "0.06",
    "nov": "0.06",
    "dec": "0.06"
  }
],
```

FIGURE 5B

```
"daily_trans_perc": [
  {
    "sun": "0.15",
    "mon": "0.14",
    "tues": "0.11",
    "wed": "0.10",
    "thurs": "0.15",
    "fri": "0.18",
    "sat": "0.17"
  }
],
"quarterly_spend_history": [
  {
    "q1_2012": "2276833",
    "q2_2012": "2415816",
    "q3_2012": "2529908",
    "q4_2012": "2419973",
    "q1_2013": "2649660",
    "q2_2013": "2794020",
    "q3_2013": "2932971",
    "q4_2013": "2659660",
    "q1_2014": "2758247",
    "q2_2014": "2759630",
    "q3_2014": "0",
    "q4_2014": "0"
  }
]
```

SYSTEMS AND METHODS FOR GENERATING AN AFFINITY GRAPH

RELATED APPLICATIONS

This application claims priority from U.S. Provisional Patent Application Ser. No. 62/134,959, filed Mar. 18, 2015, the disclosure of which is incorporated, by reference, in its entirety.

BACKGROUND OF THE INVENTION

1. Field of the Invention

The present invention generally relates to interaction analysis, and, more specifically, to systems and methods for generating an affinity graph.

2. Description of the Related Art

Typically, when a person conducts a transaction with a merchant, transaction data is generated. That data may include the time and date of the transaction, merchant identifying information, transaction information, etc. If the transaction was conducted using a credit card or debit card, the data may be provided to the card issuer.

SUMMARY OF THE INVENTION

Systems and methods for generating an affinity graph are disclosed. According to one embodiment, a method for identifying customer attributes, in an information processing apparatus including at least a memory, a communication interface, and one or more processors, may include (1) receiving customer data for a plurality of customers and merchant data for a plurality of merchants; (2) generating an initial customer table for each customer from the customer data, the initial customer tables comprising information describing each customer; (3) generating an initial merchant table for each merchant from the merchant data, the initial merchant tables comprising information describing each merchant; (4) receiving transaction data from a plurality of sources; (5) enhancing the initial customer tables based on the transaction data for transactions involving each customer; (6) enhancing the initial merchant tables based on the transaction data for transactions involving each merchant; (7) associating each customer and each merchant with at least one attribute based on the enhanced customer tables and the enhanced merchant tables; (8) determining an attribute score for each attribute; and (9) determining an affinity for one of the plurality of customers based on the attribute score for an attribute that is common to the one customer and another one of the plurality of customers.

In one embodiment, the customer data may include customer demographic data, financial account data for the customer, prior purchase data for the customer, and/or customer interest data for the customer.

In one embodiment, the merchant data may include a merchant name, a merchant industry, and a merchant location.

In one embodiment, the transaction data may include purchase data, a transaction location, social media data for the customer, online behavior data for the customer, etc.

In one embodiment, the method may further include filtering at least one of the customer data, the merchant data, and the transaction data to identify a subset of attributes.

In another embodiment, the method may further include denormalizing the transaction data by adding at least one of a customer tag and a merchant tag to each transaction in the transaction data.

In yet another embodiment, the method may further comprise determining a merchant unit level from the merchant data. The merchant unit level may be based on a geographical region.

In one embodiment, the attribute may be one of a characteristic of a good or service, a customer spend amount, a merchant's customer demographic characteristic, a merchant's product or service association characteristic, etc.

In one embodiment, the affinity may be based on a customer having at least one attribute score that is similar to at least one attribute score for another customer.

In one embodiment, the method may further include determining at least one travel pattern for at least one customer based on the customer's enhanced customer table, and presenting at least one of a communication and an offer to the customer based on the customer's travel pattern.

In one embodiment, the method may further include determining a current location of the customer based on at least one transaction that is indicative of a customer location.

BRIEF DESCRIPTION OF THE DRAWINGS

For a more complete understanding of the present invention, the objects and advantages thereof, reference is now made to the following descriptions taken in connection with the accompanying drawings in which:

FIG. 3 depicts an example of an enhanced customer table according to one embodiment;

FIGS. 4A and 4B depict exemplary scoring entries for a customer according to one embodiment;

FIGS. 5A, 5B, and 5C depict exemplary merchant scoring entries according to one embodiment;

DETAILED DESCRIPTION OF PREFERRED EMBODIMENTS

Several embodiments of the present invention and their advantages may be understood by referring to FIGS. 1-7.

Figure 1:
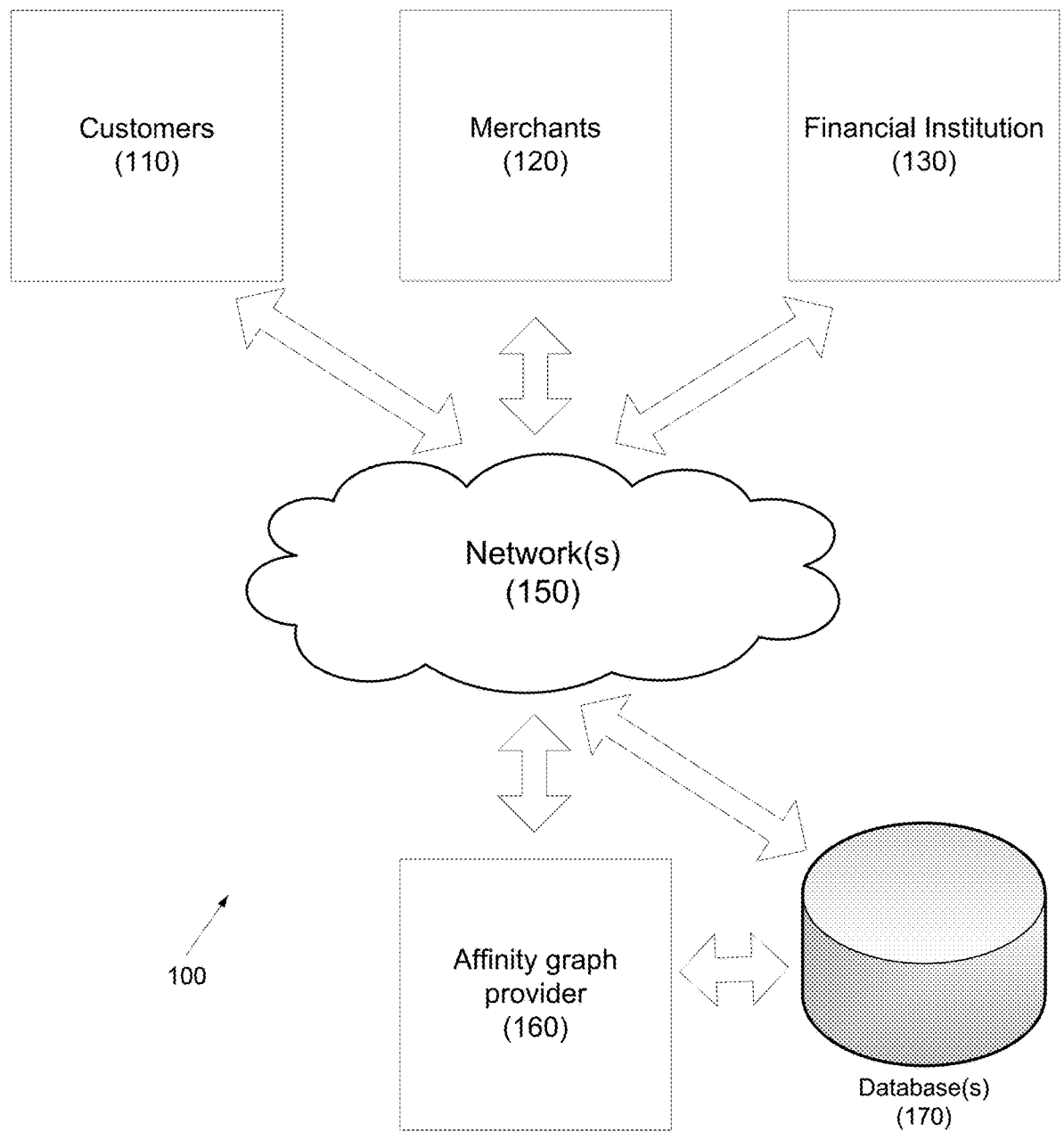
FIG. 1 depicts a system for generating an affinity graph according to one embodiment.

Referring to FIG. 1, a system for generating an affinity graph according to one embodiment is disclosed. System 100 may include a plurality of customers 110, a plurality of merchants 120, and one or more financial institution 130. In one embodiment, customers 110 may be customers of financial institution 130. For example, financial institution 130 may be an issuer for a credit card held by one or more of customers 110.

Merchants 120 may be any provider of a good or service for one or more of customers 110. In one embodiment, one or more of merchants 120 may be customers of financial institution 130. For example, financial institution 130 may be an acquirer for one or more of merchants 120.

In one embodiment, any of customers 110, merchants 120, and financial institution 130 may communicate using at least one network 150. Network 150 may be any suitable network, including the Internet, payment networks (e.g., Visa, MasterCard, American Express, private label, closed loop/over-the-top, bank networks, ACH, etc.). Other networks, including communication networks, payment networks, combinations thereof, etc. may be used as is necessary and/or desired.

Affinity graph provider 160 may communicate with one or more of customers 110, merchants 120, and financial institution 130. It may receive and process data from any of customers 110, merchants 120, and financial institution 130, and may store data in database 170.

Figure 2:
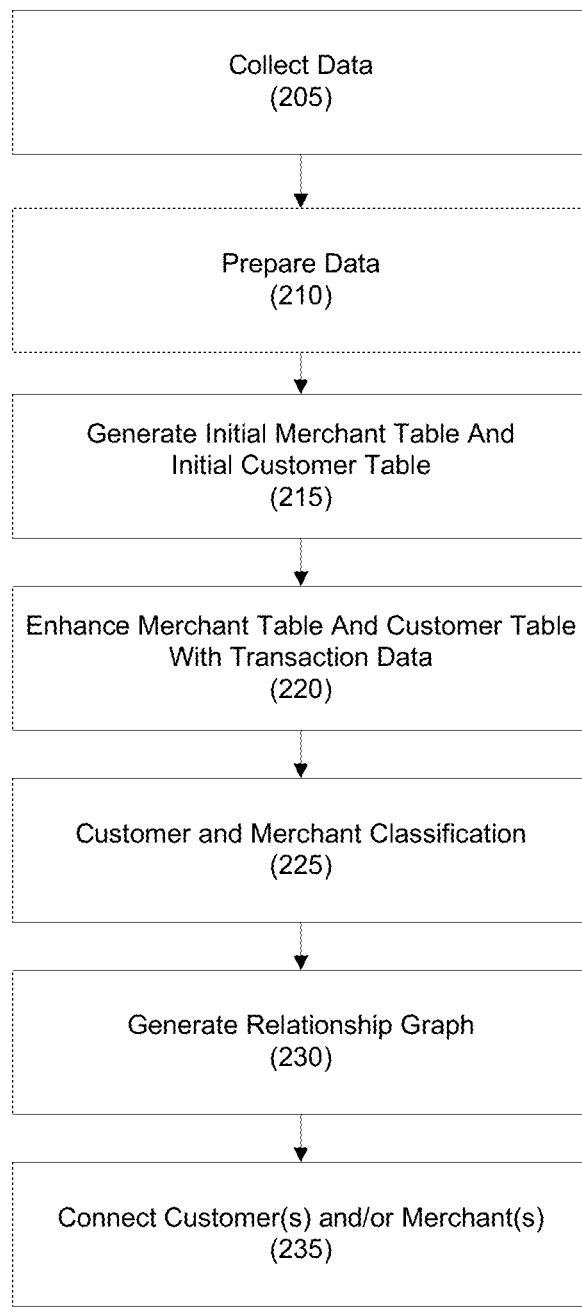
FIG. 2 depicts a method for generating an affinity graph according to one embodiment.

Referring to FIG. 2, a method for generating an affinity graph according to one embodiment is disclosed.

In step 205, data is collected. In one embodiment, the data may include customer data, merchant data, and transaction data.

Customer data may be collected. For example, the customer's billing address or zip code, gender, etc. may be collected. In addition, other data, such as data from customer relationships with an entity, such as a financial institution (e.g., mortgage payment history, bank account tenure, etc.), data from third parties (e.g., credit bureau data, etc.) may be collected. In one embodiment, personally identifiable information ("PII") is not collected.

In one embodiment, information about direct customer interactions with the financial institution may also be collected. For example, data about customer usage of the financial institution's web site, mobile app, websites visited while being online ad-targeted by the financial institution, ATMs, branches, etc. may be collected.

Merchant information may also be collected. For example, merchant names, industry codes, addresses (mailing address, longitude/latitude, etc.), etc. may be collected. In one embodiment, aggregators (e.g., Amazon.com) may provide additional information to identify the merchant that is providing the product. Merchants may be labeled and/or tagged for their relevance to a range of interests, brands, preferences, or life stages.

In one embodiment, the collected data may be stored in a database until needed. For example, in one embodiment, data may be stored in its native format in a data lake without additional processing.

In one embodiment, the data sources and type of data may vary. For example, transaction data may be received from credit/debit card issuers, payment networks (e.g., VisaNet), merchants, on-line retailers, other payment systems, ACH payments, etc. Online customer behavior may be received from Internet Service Providers (ISPs), online vendors, social media, directly from users, etc.

In one embodiment, transaction data may be related to a purchase and/or use of a good and/or service. For example, transaction data may include a merchant name/identifier, a date/time, a location, an amount spent, a good/service involved, a transaction channel (e.g., in person, on line, etc.).

In one embodiment, transaction data may include data that may not be associated with a purchase transaction. For example, transaction data may include data relating to an advertisement impression, such as the result of the customer clicking on an ad, not clicking on the ad, "hovering" over the ad, ignoring the ad, etc.

In another embodiment, transaction data may include a customer's presence on a specific URL, or a family of URLs, the customer's use of applications ("apps"), etc. For example, if the user frequents a sporting website, or uses a sports app, that may indicate an interest in sports, a particular sports league, etc.

In another embodiment, transaction data may include the customer's social media activity. For example, the customer's "likes," keyword searching, twitter mentions, merchant identification, etc. may be used to determine interests and non-interests.

In another embodiment, transaction data may include the customer's online behavior. For example, online data based on user searches, inquiries, clickstream data, etc. may be collected.

In another embodiment, transaction data and/or customer data may include an identification of products and/or services that the customer has purchased or used. The products/services may include tangible products as well as services, such as on-line bill pay, etc.

In another embodiment, transaction data and/or customer data may include the customer's travel history. For example, the customer's location may be derived from transactions, GPS, social media, beacons, calendars, social media, etc. From the transactions, the total spend in a certain location, the number of merchants that the customer transacted with, and the number of transactions may be determined. The data may be aggregated on any suitable level. For example, the customer's travel transactions may be determined for a neighborhood, city, state, region, country, etc.

Based on collected travel data, the customer's travel patterns may be determined. For example, the travel data and transaction data may indicate that the customer is a "snowbird"—meaning that the customer travels south during the winter months, and returns north during the summer months. As another example, the data may indicate that the customer makes one trip each month to the west coast. This data may be useful in presenting offers to the customer, as well as to customers with similar travel patterns.

In one embodiment, the transaction data, customer data, and/or merchant data may be received as streaming data. For example, for a card transaction (e.g., credit, debit, stored value, etc.), information such as the customer ID, the date and time of transaction, amount, location of the transaction, merchant information, etc.

It should be recognized that the different types and sources of customer data, transaction data, and merchant data are not exclusive. Any of the embodiments disclosed herein may be used together as is necessary and/or desired.

In step 210, data may be prepared. In one embodiment, the data may be prepared before it is stored in the data lake, or while it is stored in the data lake. In one embodiment, the data may be filtered, and a subset of attributes may be selected from the raw record to reduce the size of analyzed dataset. Transaction data may be denormalized by adding customer and merchant tags to the transaction stream to enhance big data processing. The data may also be serialized, compressed, and stored in a partitioned format to aid quick retrieval.

In one embodiment, some or all of the data may be aggregated, anonymized, etc.

In one embodiment, data may be processed to a common level before it is stored in the data lake. For example, customer data may be processed to be at the individual level rather than at the cookie level, device level or household level. This may be useful where a customer uses several different devices; the customer's activity on the devices may be aggregated.

Merchant data may also be processed to an appropriate merchant unit level. For merchants with more than one location, the merchant unit may be a single location, several locations within a certain radius (e.g., within 3 city blocks), within a city, within a state, within a region, etc. The merchant unit may be determined automatically based on the data feed, or it may be selected manually.

In one embodiment, each merchant may be evaluated at its most granular level. For example, some or all of the possible merchant locations (e.g., stores, point of sale device, register, etc.), channels (e.g., in person, online), aggregators (e.g., PayPal, Google Wallet, Square, etc.) in which a transaction may be conducted are identified. Thus, in one embodiment, each location, point of sale device, channel, etc. may be assigned a separate identifier.

In one embodiment, adjustments may be necessary due to different data sources (e.g., Visa and MasterCard may identify a merchant differently), address changes (e.g., a merchant may move), and the manner in which a merchant may report its data. Thus, in one embodiment, after getting the most granular level for a merchant, different levels of the hierarchy may be identifies and evaluated. Thus, a merchant could be evaluated at the register level, store level, neighborhood level, online/offline level, etc.

In another embodiment, the processing of customer and/or merchant data may be performed on data in the data lake.

In step 215, initial customer tables and merchant tables may be generated based on the data from the data lake. In one embodiment, the initial customer tables may be generated primarily with data other than transaction data, while the merchant tables may be generated primarily from transaction data. Other types of data may still be used as necessary and/or desired.

In one embodiment, each customer and each merchant and/or merchant unit may have its own table entry generated.

In one embodiment, the customer table and/or merchant tables may be populated with data that is readily available and may not require any additional processing. For example, a customer table may be populated with the customer's name, address, ZIP code, age, gender, phone number, etc. Depending on the merchant level, the merchant table may include the merchant name, address(es), industry code, latitude and longitude, etc.

In step 220, the merchant table and the customer may be enhanced by cross-referencing the merchant and customer tables, and with reference to the data from the data lake, such as transaction data, social media data (e.g., "likes," mentions, etc.), credit bureau files, internal files (e.g., propensity for a product, risk of default, etc.) third party files with merchant attributes (e.g., yelp), online behavior (e.g., bluekai), etc. For example, a merchant table may be enhanced by aggregating customer attributes over some or all transactions (e.g., card purchases). Thus, the type of the merchant's customers (e.g., as profiled by age, gender, etc.) as well as the type of transactions conducted by the merchant's customers (e.g., cost, luxury, bargain, type of payment vehicles used, affinity to dogs, etc.) may be associated with the merchant.

In one embodiment, the cross-referencing of the merchant tables, the customer tables, and the data may be an iterative process, or a pseudo-iterative process. For example, the customer's wallet size (e.g., the amount that a customer spends each year on card transactions) may be used as a variable to calculate a new merchant attribute, such as the average wallet size for customers that shop at a given merchant. This information may be used, for example, to determine if the merchant can be considered "luxury" or "bargain" within its respective industry.

An example of an enhanced customer table is provided in FIG. 3. The customer table may include indicators (e.g., 1 indicates that the customer has that card; 0 indicates that the customer does not have that card); length of customer tenure, customer online activity, different types of accounts the customer has (e.g., retail, mortgage, auto loan), amount spent with the financial institution in the past 12 months, the amount the customer has spent outside the financial institution, the size of the customer's wallet (e.g., all spending in last 12 months), customer statistics with the financial institution (e.g., bank's share of wallet), customer geography information (e.g., DMA code, postal code, state), etc.

The fields in the example enhanced customer table of FIG. 3 are exemplary only. Other fields may be included as necessary and/or desired.

In step 225, the merchant(s) may be classified and/or tagged. In one embodiment, classification/tagging may identify patterns associated with each merchant or group of merchants and may identify other merchants with the same or a similar pattern. In one embodiment, a number of different potential merchant interest categories may be defined, and the merchants may be classified/tagged with one or more of the attributes. For example, the interests may be based on a good or service that the merchant provides, brands that the merchant provides, an attribute of the good or service (e.g., luxury, bargain, online, offline, etc.), a type/percentage of customer types (e.g., male/female, age range, repeat/new, etc.), customer associations (e.g., type of financial instruments used, financial products associated with the customer, etc.), other types of good/services or merchants that customers patronize, the merchant's industry, the extent of the merchant's online presence, etc. Any suitable interest category may be used as is necessary and/or desired.

In one embodiment, machine learning may be used to identify additional classification/tags as is necessary and/or desired.

In one embodiment, additional processing may be used to identify similar merchants. For example, in one embodiment, a merchant tagging algorithm may be used. The merchant tagging algorithm may be an ensemble model composed of various machine learning techniques including K nearest neighbors, matrix factorization, random forests, and graph analysis. Each method may produce a score on a given merchant's likelihood on being part of a given interest or brand tag. The scores may then be fed into a random forest model to produce a final composite merchant score for the specific interest, vertical, brand, etc.

In one embodiment, merchants that may raise customer privacy concerns may be identified by a similar merchant classification process. For example, transactions involving medical conditions, psychological health, financial services and transfers, insurance, accounting, tax preparation, funeral services, nursing homes, childcare, fines, bankruptcy, legal services, security services, alimony, child support, credit reporting, etc. may be excluded from processing. In one embodiment, this may be implemented by removing sensitive industry codes, removing merchants that contain certain words (e.g., "strip club"), algorithmically finding offensive merchants based on past transactions (e.g., a merchant is labeled as a steakhouse as a cover for a different business).

These merchants may then be eliminated from subsequent processing steps and analysis.

In step 230, using the merchant score vector and a customer's transaction history, the customer may be scored for a given interest. For example, a customer's "score" may be calculated by analyzing a customer's transaction history at merchants scoring above a threshold for a given interest. If a customer had many transactions, shopped at many different merchants, shopped at highly scoring merchants in that interest, spent recently or in great volume, the customer may receive a high score. If the customer does not have a high match with an interest the customer may receive a lower score. Any suitable scoring convention, such as a numeric scale (e.g., 0 to 100, 0-10, etc.), high-medium-low, yes-no, etc., as necessary and/or desired may be used.

In one embodiment, merchants may be similarly scored.

In one embodiment, customers may be grouped together into a small number of segments based on sets of common interests, brands, life stages, etc. The segmentation algorithm may involve techniques such as K-Means, hierarchical clustering, canopy clustering, etc. Any other suitable algorithm may be used as necessary and/or desired.

FIGS. 4A and 4B are example scoring entries for a customer. FIG. 4A indicates a brand (e.g., brand 1) that a customer may have purchased. It may include data such as the customer's interest in the brand (e.g., no interest, enthusiast, tastemaker, dabbler, etc.), the score for the brand, the number of transactions involving the brand in the past 12 months, the spend on the brand in the past 12 months, the number of distinct merchants where the customer has purchased the brand, etc. Other brand data may be provided as is necessary and/or desired.

A customer may have a record for each brand that the customer has purchased. In one embodiment, only the brands that the customer has purchased within, for example, the past 12 months may have records. In another embodiment, only the brands that have repeat purchases may have records. Other reasons for maintaining or not maintaining records may be used as necessary and/or desired.

In one embodiment, a customer may have similar records for an interest (e.g., FIG. 4B is an example record for a customer's interest in baseball), a type of product (e.g., dog toys), a type of merchant (e.g., steakhouses), specific merchants (e.g. luxury hotels), travel history (e.g., European traveler), life stage (e.g., new baby, recently moved, job change, sending child to college), etc.

FIGS. 5A, 5B, and 5C depict example merchant scoring entries according to one embodiment. The merchant scoring may include merchant information (e.g., merchant id, name, country state, MCC code information, etc.); transaction information (e.g., total transactions within last 12 months, total spend, transaction percentage by region, transaction percentage by hour, transaction percentage by month, transaction percentage by day, etc.), customer demographic information (e.g., male customer percent, female customer percent, customer age, etc.), bank spending information, spending percentage by card, etc. Other transaction information may be provided as is necessary and/or desired.

Based on the scoring for the customers and the merchants, in step 230, an affinity graph may be generated. Conceptually, the affinity graph may be thought of as being composed of nodes and edges, so a node can be a customer, a merchant, a good/service preference (e.g., luxury), location (e.g., neighborhood, city, state, region, country, etc.), etc. The affinity graph may be similar to the merchant table and the customer table, but may include the additional attributes or tags. For a merchant, for example, a tag may indicate that the merchant sells dog supplies, whereas on the customer side, the tag may indicate that the customer likes dogs.

In one embodiment, the affinity graph may be generated by linking the customer dataset and the merchant dataset. For example, the affinity graph may be based on initial customer and merchant tables, the enhanced customer and merchant data, the customer and merchant tagging, and the customer and merchant scoring.

In one embodiment, the merchant-to-customer node connections (i.e., the "edges") at first could be a summary of transaction history. These edges may have several attributes (summary of activity over past 6 months, 12 months, date of last transaction, etc.). In another embodiment, the edges may be pre-calculated recommendations for a customer. For example, a merchant may be recommended to a customer based on products or services based on interests, spending, etc. In another embodiment, customers may be linked by having a common household identifier, common merchants, common transaction (e.g., customer A sends customer B money), common brands, common interests, common locations, etc.

In another embodiment, a travel graph for a customer may be generated. Like the affinity graph, the travel graph may identify customer transactions in an area (e.g., neighborhood, city, state, region, country, etc.) as well as the season and/or period of travel. For example, a customer may travel to California once a month, and to the Caribbean every February. From the transaction data, the customer's total spend, number of transactions, and the number of merchants may be determined, and an area score may be determined.

As with the affinity graph, the travel aspect may be used to provide recommendations and/or offers to customers based on anticipated travel, make recommendations and/or offers to other customers with similar travel scores, etc.

In step 235, access to the affinity graph and/or the underlying data may be granted. In one embodiment, the data may be accessed using an application programmable interface that may interact with a web-based service, application, a stand-alone service, etc. In one embodiment, access to data may be controlled based on the user's roles and the intent of the data. For example, a particular type of food that a customer may be fond of may not be helpful in determining creditworthiness of the customer, but it may be helpful in obtaining a restaurant recommendation from the customer. Thus, in one embodiment, controls and/or restrictions may be placed on certain data.

In one embodiment, customer and merchant data may be indexed on a distributed system in order to enable rapid querying, aggregation of the data, and real-time exploration of ideas and hypotheses. For example, real-time search tools like Lucene, Elasticsearch, Solr may be used to index and expose the data, and NoSQL data stores like HBase, Cassandra, and MongoDB may be used to enable fast retrieval and updates of records.

In one embodiment, customer data may be queried and explored through a graphical interface that allows the user to select attributes for a target population. For example, demographic, spend, interest, brand breakdowns, etc. may be displayed for a target population, and may be further filtered and refined in real time. The resulting target population may be used in, for example, a marketing campaign. In another embodiment, similar customers from another prospect population to those of the target population may be identified for cross-selling campaigns.

In another embodiment, the affinity graph and/or its constituent data may be used to personalize an interface. For example, if the customer data indicates that the customer likes dogs, the customer's home screen on an app, website, ATM, etc. may have a dog-related background. Similarly, if the customer data indicates that the customer likes to travel to tropical destinations, the background may be a tropical beach scene. Other types of personalization may be used as necessary and/or desired.

In another embodiment, the affinity graph and/or its constituent data may be used for marketing purposes, such as promotions (e.g., coupons, discounts, etc.), rewards, redemption of reward points, informing the customer of new relevant products, etc.

As another use case, the affinity graph and/or its constituent data may be used for cross-selling purposes.

In another embodiment, additional information that may be known about the customer, demographic information, etc. may be considered.

In another embodiment, the data may be provided to a partner that may use it in a different system.

In other embodiments, the affinity graph and/or its constituent data may be used to support customer care interactions; make recommendations to the customer for rewards redemption; make new merchant recommendations to the customer; enhance fraud models; etc.

Figure 6:
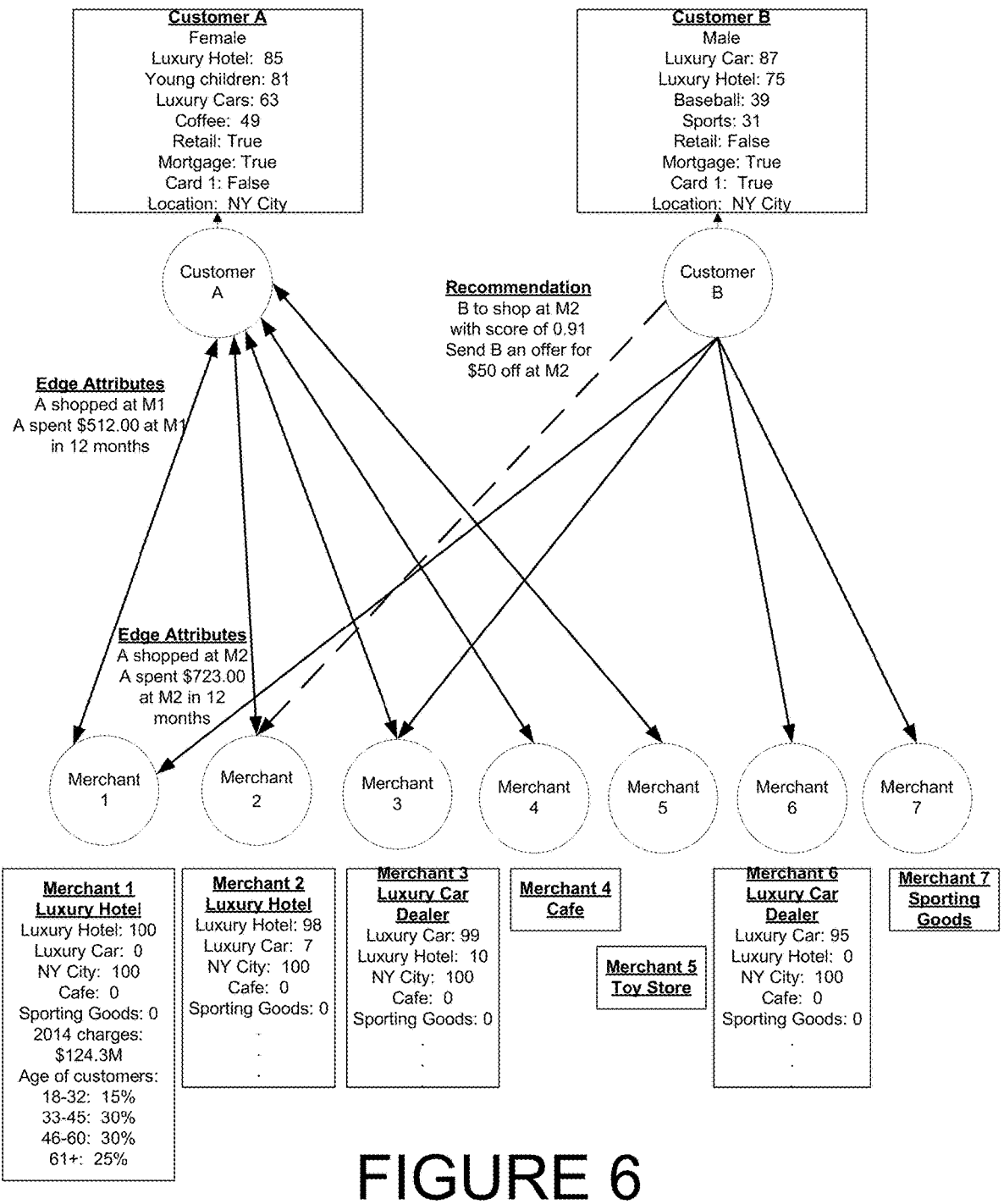
FIG. 6 depicts an example affinity graph according to one embodiment.

Referring to FIG. 6, an example affinity graph is provided. FIG. 6 includes two representative customers—customer A and customer B. It should be recognized that a greater number of customers may be provided.

In this example, Customer A, a female, has a high score for spend and/or interest related to luxury hotels and a high score for spend and/or interest related to young children. Customer A also has a medium score for spend and/or interest related to luxury cars and coffee. Customer A has a retail account and a mortgage, but does not have an account for Card 1 (e.g., a credit card product).

Customer B, a male, has a high spend and/or interest related to luxury cars, a medium spend and/or interest related to luxury hotels, and a low spend and/or interest related to baseball and sports. Customer B does not have a retail banking account, but does have a mortgage and an account for Card 1.

It should be recognized that each customer may have a greater number of interests and scores, and each customer record may include additional customer information (e.g., gender, age, location, etc.). It should also be recognized that the absence of a score in an interest category only means that there is no evidence of a customer's interaction with the interest category in the available data set. It does not preclude the possibility of an affinity to the interest category.

In the example, seven exemplary merchants—Merchant 1, Merchant 2, Merchant 3, Merchant 4, Merchant 5, Merchant 6, and Merchant 7—are provided. Again, like with the customers, it should be recognized that the seven merchants are exemplary only, and a greater number of merchants may be part of an affinity table.

Merchant 1 is described as a luxury hotel, and has a high score for luxury hotel, a low score for luxury car, café, and sporting goods. The 2014 charges, as well as an age breakdown of its customers is provided. Other scoring, for example, a gender breakdown, sales breakdown, additional good/service information, etc. may be provided as necessary and/or desired.

Merchant 2 is described as a luxury hotel, and Merchants 3 and 6 are described as luxury car dealers, and have scores for that good/service. Merchant 4 is described as a café, Merchant 5 is described as a toy store, and Merchant 7 is described as a sporting goods store. In one embodiment, Merchants 1, 2, 3, and 6, as well as Customers A and B may be linked with attributes for "Luxury" and "New York City."

According to the affinity chart in FIG. 6, Customer A spent $512.00 at Merchant 1 in the past twelve months, and $723.00 at Merchant 2 in the past twelve months. Customer A also shopped at Merchants 3, 4, and 5. This information is provided at the "edges."

Customer A and Customer B have both made purchases from Merchants 1 and 3, a luxury hotel and luxury car dealer respectively. In view of this, a recommendation can be made for Customer B to make a purchase at Merchant 2. The score for this match may be 0.91. Customer B may then be sent an offer for $50 off a stay at Merchant 2.

It should be recognized that the scoring is exemplary only, and different scoring values, methods, etc. may be used as is necessary and/or desired. For example, instead of a numerical score, a letter score (A-F), word score (high-medium-low), etc. may be used.

Figure 7:
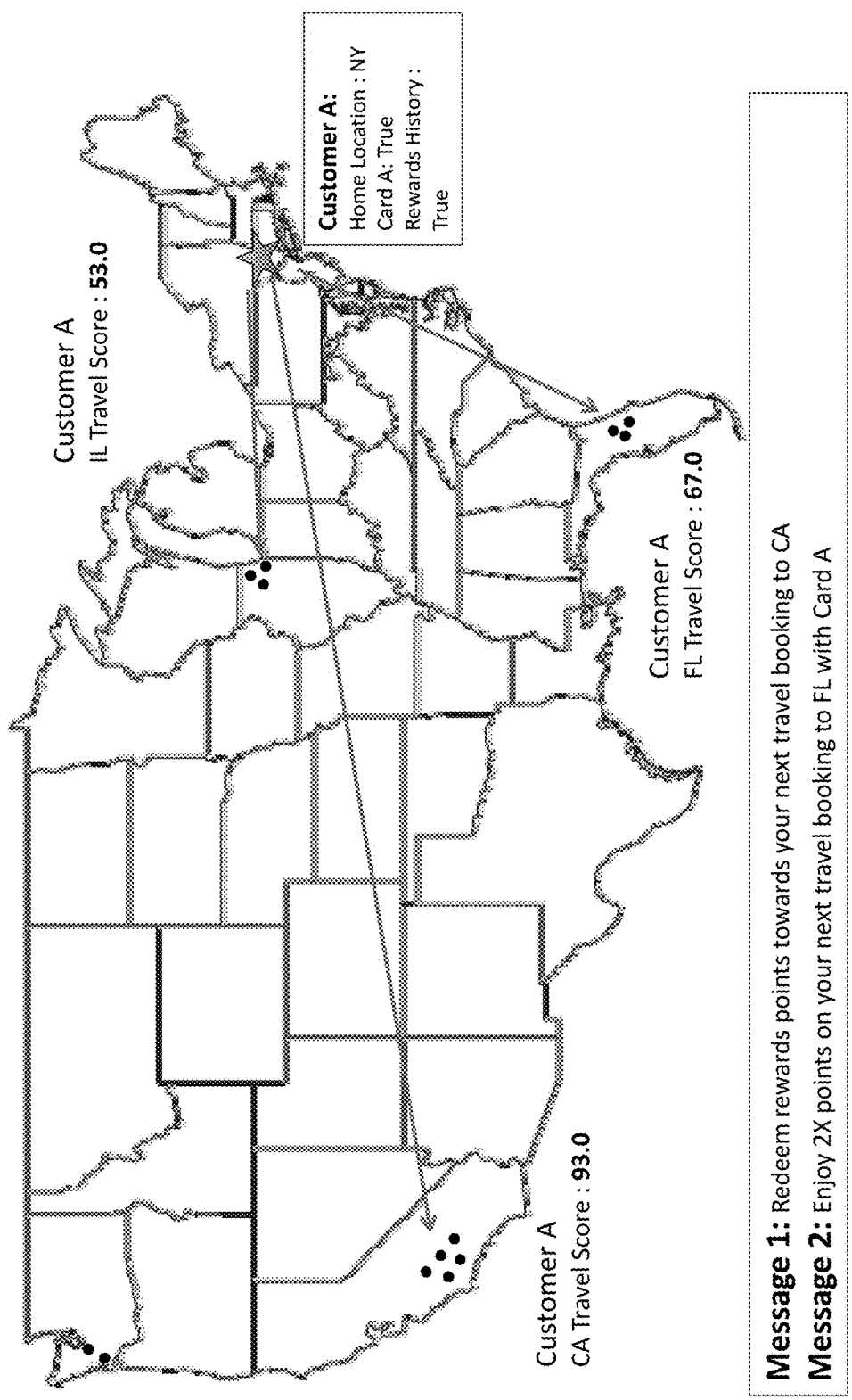
FIG. 7 depicts an example travel graph according to one embodiment.

In one embodiment, a travel graph may be generated for one or more customers. Referring to FIG. 7, an example travel graph is provided. In this example, representative customer A is a resident of New York. The current location of Customer A may be derived by analyzing his transactions in certain categories that are likely to indicate a physical presence, such as gas station transactions and grocery store transactions. Other transactions, types of transactions (e.g., card present transactions) and data sources (e.g., GPS) may be used as is necessary and/or desired.

Customer A currently has Card A, and has previously redeemed reward points earned with this card.

Customer A's top three domestic travel destinations are California, Florida and Illinois with travel scores of 93.0, 67.0 and 53.0 respectively, showing a greater travel propensity towards CA than other US states. These scores may be derived, for example, by analyzing the transactions that have occurred at these locations. It may be noted here that the customer A could have other travel scores for domestic as well as international destinations.

In one embodiment, transactions that are more likely to indicate a physical presence (e.g., gas stations, grocery stores, card present transactions, etc.) may be used to determine the customer's travel locations.

Given customer A's travel propensity towards CA and FL, his/her experience with Card A can be personalized. For example, when customer A logs into his or her rewards account online, a personalized message, such as "Redeem your reward points towards your next travel booking to California" may be displayed. Additionally, when customer A interacts with the issuer of Card A through an online account, another personalized message can be displayed that reads "Enjoy DOUBLE points on your next travel booking to Florida with Card A." Other personalized messages may be provided as is necessary and/or desired.

As with the example in FIG. 6, it should be recognized that the scoring is exemplary only, and any suitable scoring values, methods, etc. may be used as is necessary and/or desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine may include distributed systems, such as Hadoop Spark and Elasticsearch.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, Scala, Python, R, Hive, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for identifying customer attributes, comprising:
   in an information processing apparatus including at least a memory, a communication interface, and one or more processors:
      receiving electronic customer data for a plurality of customers and electronic merchant data for a plurality of merchants;
      processing the electronic customer data to a common level for the plurality of customers;
      generating an initial customer table for each customer from the processed electronic customer data, the initial customer tables comprising information describing each customer;
      generating an initial merchant table for each merchant from the electronic merchant data, the initial merchant tables comprising information describing each merchant;
      receiving, by a data lake using a set of Application Programming Interfaces (APIs), electronic transaction data from a plurality of web-based services as a data stream, the electronic transaction data in the data stream being tagged with a customer tag or merchant tag;
      storing the electronic transaction data, that has been tagged, as serialized data in a data lake;
      enhancing the initial customer table for each customer by cross referencing the initial customer table with the electronic transaction data for transactions from the data lake involving each customer;
      enhancing the initial merchant table for each merchant by cross referencing the initial merchant table with the electronic transaction data from the data lake for transactions involving each merchant;
      associating each customer and each merchant with at least one attribute of a plurality of attributes based on the enhanced customer tables and the enhanced merchant tables;
      for a first customer, determining a customer attribute score for an attribute associated therewith, wherein the customer attribute score indicates a customer interest level in the attribute, wherein the attribute comprises a characteristic of a good or a service;
      for a first merchant, determining a merchant attribute score for the attribute;
      generating an affinity graph based on the customer enhanced table and the merchant enhanced table, the affinity graph comprising, a node connection between a second customer and the first merchant, a node connection between the second customer and a second merchant, and a node connection between the first customer and the second merchant;
      determining a potential merchant affinity between the first merchant and the first customer based on the customer attribute score, the merchant attribute score, and the affinity graph.

2. The method of claim 1, wherein the electronic customer data comprises customer demographic data.

3. The method of claim 1, wherein the electronic customer data comprises financial account data for the customer.

4. The method of claim 1, wherein the electronic customer data comprises prior purchase data for the customer.

5. The method of claim 1, wherein the electronic customer data comprises interest data for the customer.

6. The method of claim 1, wherein the electronic merchant data comprises a merchant name, a merchant industry, and a merchant location.

7. The method of claim 1, wherein the electronic transaction data comprises purchase data.

8. The method of claim 1, wherein the electronic transaction data comprises a transaction location.

9. The method of claim 1, wherein the electronic transaction data comprises social media data for the customer.

10. The method of claim 1, wherein the electronic transaction data comprises online behavior data for the customer.

11. The method of claim 1, further comprising:
filtering at least one of the electronic customer data, the electronic merchant data, and the electronic transaction data to identify a subset of attributes.

12. The method of claim 1, further comprising:
denormalizing the electronic transaction data by adding at least one of a customer tag and a merchant tag to each transaction in the electronic transaction data.

13. The method of claim 1, further comprising:
determining a merchant unit level from the electronic merchant data.

14. The method of claim 1, wherein the merchant unit level is based on a geographical region.

15. The method of claim 1, further comprising:
determining at least one travel pattern for at least one customer based on the customer's enhanced customer table.

16. The method of claim 15, further comprising:
presenting at least one of a communication and an offer to the customer based on the customer's travel pattern.

17. The method of claim 1, further comprising:
determining a current location of the customer based on at least one transaction that is indicative of a customer location.

* * * * *